(12) United States Patent
Bangalore et al.

(10) Patent No.: US 10,997,013 B2
(45) Date of Patent: May 4, 2021

(54) SYSTEMS AND METHODS OF ANALYZING USER RESPONSES TO INQUIRIES TO DIAGNOSE AND MITIGATE REPORTED PERFORMANCE ISSUES ON A CLIENT DEVICE

(71) Applicant: Microsoft Technology Licensing, LLC, Redmond, WA (US)

(72) Inventors: Ramesh T. Bangalore, Redmond, WA (US); Neelanjana Sachdev, Redmond, WA (US); Scott Garrett Thompson, Seattle, WA (US); Sushma Ashwin Rao, Snoqualmie, WA (US); Dori Paris, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 126 days.

(21) Appl. No.: 16/215,074

(22) Filed: Dec. 10, 2018

(65) Prior Publication Data

US 2020/0183772 A1 Jun. 11, 2020

(51) Int. Cl.
*G06F 11/07* (2006.01)
*G06F 11/30* (2006.01)
(Continued)

(52) U.S. Cl.
CPC ...... *G06F 11/0793* (2013.01); *G06F 11/0709* (2013.01); *G06F 11/079* (2013.01);
(Continued)

(58) Field of Classification Search
CPC .............. G06F 11/0793; G06F 11/0709; G06F 11/0751; G06F 11/0787; G06F 11/079;
(Continued)

(56) References Cited

U.S. PATENT DOCUMENTS 7,293,201 B2 11/2007 Ansari
7,310,350 B1 12/2007 Shao et al.
(Continued)

FOREIGN PATENT DOCUMENTS

WO 2016160640 A1 10/2016
WO 2018204031 A1 11/2018

OTHER PUBLICATIONS

Harley, Nick, "How Error Monitoring Helps You Find Bugs Before Users Do", Retrieved from: https://scotch.io/bar-talk/how-error-monitoring-helps-you-find-bugs-before-users-do, Retrieved Date: Oct. 10, 2018, 7 Pages.
(Continued)

*Primary Examiner* — Matthew M Kim
*Assistant Examiner* — Kurosu Risa Altaf
(74) *Attorney, Agent, or Firm* — Newport IP, LLC; Mike R. Cicero

(57) ABSTRACT

A system analyzes descriptions of performance issues that are submitted responsive to inquiries to expediently diagnose and mitigate performance issues. In implementation, inquiries associated with features of an application are exposed at client device. Then, user responses to the inquiries are provided to relief evaluators that analyze the user responses to diagnose reported performance issues. The relief evaluators include diagnostic packages that diagnose predetermined performance issues by analyzing individual user responses to particular inquiries. The relief evaluators also include relief packages that mitigate the predetermined performance issues. A relief package may mitigate the predetermined performance issue by displaying a message that informs the user how to adjust the system state to prevent the reported performance issue "symptom" from reoccurring. Additionally, or alternatively, a relief package may mitigate the performance issue by automatically adjust-
(Continued)

ing the system state to prevent the reported performance issue "symptom" from reoccurring.

20 Claims, 6 Drawing Sheets

(51) Int. Cl.
    *G06F 11/34*     (2006.01)
    *G06F 40/40*     (2020.01)

(52) U.S. Cl.
    CPC ...... *G06F 11/0751* (2013.01); *G06F 11/0787* (2013.01); *G06F 11/3006* (2013.01); *G06F 11/3438* (2013.01); *G06F 40/40* (2020.01)

(58) Field of Classification Search
    CPC ... G06F 11/3006; G06F 11/3438; G06F 40/40
    See application file for complete search history.

(56) References Cited

U.S. PATENT DOCUMENTS

| | | | |
|---|---|---|---|
| 7,996,723 | B2 | 8/2011 | Levine et al. |
| 8,271,951 | B2 | 9/2012 | Brugler et al. |
| 8,515,803 | B2 | 8/2013 | Meyer et al. |
| 8,924,935 | B1 | 12/2014 | Chopra et al. |
| 9,189,317 | B1 | 11/2015 | Marimuthu |
| 9,405,825 | B1* | 8/2016 | Kuznetsova .......... G06F 16/334 |
| 9,471,594 | B1* | 10/2016 | Schnegelberger .... G06F 16/185 |
| 2002/0118220 | A1 | 8/2002 | Lui et al. |
| 2004/0210899 | A1 | 10/2004 | Somogyi |
| 2008/0288271 | A1 | 11/2008 | Faust |
| 2014/0019228 | A1 | 1/2014 | Aggarwal et al. |
| 2014/0108095 | A1 | 4/2014 | Tetreault et al. |
| 2014/0358636 | A1 | 12/2014 | Nowak et al. |
| 2015/0242593 | A1 | 8/2015 | Levenson et al. |
| 2015/0356578 | A1 | 12/2015 | Li |
| 2016/0029145 | A1 | 1/2016 | Angiolillo et al. |
| 2016/0119477 | A1* | 4/2016 | Sharpe ................ H04M 3/5233 379/265.09 |
| 2016/0219398 | A1* | 7/2016 | Kamensky ............. G06Q 30/02 |
| 2016/0239374 | A1* | 8/2016 | Schnegelberger .. H04L 41/0654 |
| 2016/0330332 | A1 | 11/2016 | Celik et al. |
| 2017/0345417 | A1* | 11/2017 | Kennewick, Jr. ... G06F 16/3329 |
| 2018/0336475 | A1* | 11/2018 | Chakra ................... G06F 11/00 |
| 2018/0357733 | A1* | 12/2018 | Valder ................. G06F 16/9535 |
| 2020/0159837 | A1* | 5/2020 | Tiwari ................... G06F 40/295 |

OTHER PUBLICATIONS

"Client-Side Survey Contro 1—Patent Application filed in U.S. Appl. No. 15/471,391", filed Mar. 28, 2017, 22 Pages.
"International Search Report and Written Opinion Issued in PCT Application No. PCT/US2018/057903", dated Jan. 8, 2019, 13 Pages.
"International Search Report and Written Opinion Issued in PCT Application No. PCT/US19/064085", dated May 4, 2020, 12 Pages.

\* cited by examiner

SYSTEMS AND METHODS OF ANALYZING USER RESPONSES TO INQUIRIES TO DIAGNOSE AND MITIGATE REPORTED PERFORMANCE ISSUES ON A CLIENT DEVICE

BACKGROUND

Some software applications are designed to expose user surveys that solicit user feedback with respect to specific functionalities. Software developers consider this user feedback to continuously improve these specific functionalities and associated user experience. In order to present questions to users in an appropriate context, it is often desirable to expose specific user surveys in response to a user performing specific triggering activities. For example, a user survey that solicits feedback with respect to a specific feature that has been recently added to an application might be exposed immediately after that specific feature is used for the first time. In this way, feedback is solicited while the users' experiences with the specific feature remain fresh in their memory.

In some cases, performance issues related to a specific feature may result when a current system state of a computing device prevents operation of the specific feature. For example, an application might disable certain functionalities when a license expires and the application becomes deactivated. In these cases, user dissatisfaction may be exacerbated as a result of the user being unaware that simply altering the current system state (e.g., by renewing a license) could immediately remedy the performance issue. For example, the user might falsely presume that the performance issue results from a software bug and that it will persist until a software patch is subsequently made available for installation.

Since the performance issue could be mitigated immediately by altering the system state, expediting how quickly the performance issue is diagnosed and the user informed as to how to appropriately alter the system state can significantly improve the operation of the application and relieve the user's dissatisfaction. Unfortunately, conventional software applications are incapable of analyzing user feedback to perform any diagnosis locally on a client device. Such conventional applications are ineffective at quickly relieving the users' dissatisfaction since the user feedback is simply provided to developers who analyze the feedback long after the performance issue was initially reported. Moreover, such applications are ineffective at providing any relief whatsoever absent an active Internet connection.

It is with respect to these and other considerations that the disclosure made herein is presented.

SUMMARY

Technologies described herein enable a system to locally analyze a description of a performance issue that is submitted in response to an inquiry (e.g., a user survey) to expediently diagnose and mitigate the performance issue. Embodiments described herein enable a system to expose inquiries associated with various functionalities of an application. When user responses are submitted in response to the inquiries, the system provides the user responses to relief evaluators that analyze the user responses to diagnose performance issues associated with the various functionalities.

The relief evaluators may include diagnostic packages that are designed to diagnose predetermined performance issue "symptoms" based at least in part on the user responses to the inquiries. For example, suppose that a user response includes a description of a particular performance issue "symptom" such as a particular application feature ceasing to function. Here, a diagnostic package may be designed to analyze the description to determine that a user is reporting dissatisfaction with the application due to the particular performance issue "symptom." Further suppose that the particular performance issue is known to result from a predetermined system state of the application and/or a client device running the application. Stated alternatively, the predetermined system state may be considered to be a performance issue "cause" of the reported performance issue "symptom." Thus, the diagnostic package may be further designed to determine whether a current system state of the application and/or client device matches the predetermined system state and, therefore, is the probable "cause" of the particular "symptom" that is being reported.

The relief evaluators further include relief packages that are designed to mitigate the predetermined performance issues. In some instances, a relief package may be designed to mitigate the predetermined performance issue by displaying a message that informs the user how to adjust the system state to prevent the performance issue "symptom" from reoccurring. Stated alternatively, mitigation of the performance issue might be accomplished by simply informing the user of the performance issue "cause." Additionally, or alternatively, a relief package may be designed to mitigate the performance issue by automatically adjusting the system state to prevent the performance issue "symptom" from reoccurring. Thus, in the event that a user reports a particular performance issue "symptom" while the current system state matches the predetermined system state that is known to cause the particular performance issue "symptom," the system may expediently execute a specific relief package that adjusts the current system state to eliminate the performance issue "cause."

Furthermore, in various implementations, both of the diagnosis package and the relief package can be executed locally on a user's client device—without transmitting data over the internet. In this way, performance issues can be expediently mitigated without having to transmit user responses to external resources and without forcing users to endure the performance issue while the user responses are reactively analyzed and acted upon. It can be appreciated that preemptively staging relief evaluators at the client device results in a significant reduction in bandwidth usage because performance issues can be diagnosed locally at the client device without transmitting data back and forth to various external resources for diagnosis as conventional systems are required to do.

In an exemplary embodiment, a client device receives inquiry data from a server that is external to the client device. Such exemplary inquiry data defines inquiries associated with various features of an application. Exemplary inquiry data can further define trigger criteria for triggering exposure of individual inquiries through an inquiry user interface. For example, an inquiry that solicits feedback associated with a specific feature may have corresponding trigger criteria to cause exposure of the individual inquiry immediately following the fifth time the specific feature is used. In this way, feedback is solicited only after a user has become familiar with the specific feature and also while the user's experience with the specific feature remains fresh in his or her memory.

Once the inquiry data is received at the client device, user activity may then be monitored at the client device to determine when trigger criteria for individual inquiries is satisfied. Responsive to the user activity satisfying trigger criteria for a particular inquiry, the client device exposes the particular inquiry through the inquiry user interface to solicit feedback in the form of a user response. As used herein, the term "inquiry user interface" generally refers to any computing interface that is perceptible to a user and suitable for soliciting feedback of any type from the user. An exemplary inquiry user interface includes displaying the particular inquiry via a pop-up survey on a display of the client device. Any other user interfaces that are suitable for exposing inquiries to solicit user feedback are also contemplated and within the scope of the present disclosure.

The inquiry user interface may enable the user to provide various types of feedback in response to the particular inquiry that is being exposed. For example, the user may be prompted to provide a rating in association with a specific feature of the application. The rating may be based on a predetermined scale such as a scale from one ("1") star to five ("5") stars, where a one-star rating indicates strong user dissatisfaction and a five-star rating indicates strong user satisfaction. For example, the inquiry user interface may include a sequence of user interface elements that individually correspond to the different potential ratings of the predetermined scale. Additionally, or alternatively, the user may be prompted to provide a natural language (e.g., text-based) description of his or her experience with the specific feature of the application. For example, the inquiry user interface may include a text-entry field into which the user can type and/or dictate a description of any performance issue that they may have experienced in association with the specific feature.

Upon a user response to the particular inquiry being submitted, the user response is provided to multiple different relief evaluators. In some embodiments, the multiple different relief evaluators are received from one or more resources that are external to the client device (e.g., a relief evaluator distribution server) and are stored at the client device in a diagnostic event hub. In this way, the multiple different relief evaluators are preemptively staged for use at the client device before the exposure of the particular inquiry is even triggered. Then, when the user response is submitted in response to the particular inquiry, the user response may be broadcasted to the multiple different relief evaluators that have already been preemptively staged on the client device.

Individual user responses being provided to one or more of the relief evaluators may be based on the individual user responses having a rating that is below a threshold rating. For example, providing the individual user responses to one or more relief evaluators may be preconditioned on the rating provided by the user being two-stars or less out of a possible five-star rating. In this way, the processing resources such as processing cycles and/or memory usage that are consumed when the diagnostic packages analyze the user responses are only consumed if the user is reporting dissatisfaction in response to the inquiries.

Individual relief evaluators may include both a corresponding diagnostic package for diagnosing predetermined performance issues and also a corresponding relief package for mitigating the predetermined performance issue. For example, a software developer that is responsible for a specific functionality may have knowledge that a particular system state of the application and/or computing device causes the predetermined performance issue to occur in association with that specific functionality. As a highly specific but nonlimiting example, the software developer may have intentionally designed the specific functionality to become disabled if the product license associated with the application becomes expired. Under these circumstances, if the product license expires and then the user reports a performance issue "symptom" as the specific functionality inexplicably ceasing to function, it may be presumed with a high degree of confidence that the reported performance issue can be mitigated by prompting the user to renew the product license for the application.

Thus, the individual relief evaluators may correspond to specific predetermined performance issues that are readily diagnosable and mitigatable upon being diagnosed. The individual diagnostic packages may be designed to diagnose the predetermined performance issue "symptoms" based at least in part on the user responses to the inquiries. A typical user response might include a natural language description of whatever performance issue "symptom" is ailing the user. For example, the particular inquiry that is exposed might ask the user for feedback related to a "Track-Changes" functionality of the application and the user response might include submitted comments that expressly state, "I'm having frustrations with this feature because it was working quite well but then stopped working about a week ago." A diagnostic package may use a natural language understanding model to analyze the natural language description to determine the specific performance issue that the user is reporting (e.g., the inoperability of the "Track Changes" functionality).

Upon determining the specific performance issue that the user is reporting, the diagnostic package may determine whether a current system state of the application and/or client device matches a predetermined system state that is known to be a performance issue "cause" of the reported "symptom." Continuing with the example of the software developer having designed the specific functionality to become disabled if the product license expires, the diagnostic package may be designed to determine whether the product license for the application is current or expired. In this example, a particular diagnostic package that is associated with this performance issue may be satisfied in the event that the user response provides a natural language description of the predetermined performance issue "symptom" and the system state matches the performance issue "cause."—e.g., the license being expired.

In response to the particular diagnostic package being satisfied, a corresponding relief package may be executed to mitigate the reported predetermined performance issue. In some instances, a relief package may be designed to mitigate the predetermined performance issue by displaying a message that informs the user how to adjust the system state to prevent the performance issue from reoccurring. Additionally, or alternatively, a relief package may be designed to mitigate the performance issue by automatically adjusting the system state to prevent the performance issue from reoccurring. Thus, in the event that a user reports a particular performance issue while the current system state matches the predetermined system state that is known to cause the particular performance issue, the system may expediently execute a specific relief package that mitigates the performance issue. Furthermore, in various implementations, both of the diagnosis package and the relief package can be executed locally on a user's client device. In this way, performance issues can be expediently mitigated without having to transmit user responses to external resources and without forcing users to endure the performance issue while the user responses are reactively analyzed and acted upon.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical to refer to each individual item. Generic references to the items may use the specific reference number without the sequence of letters.

DETAILED DESCRIPTION

Figure 1:
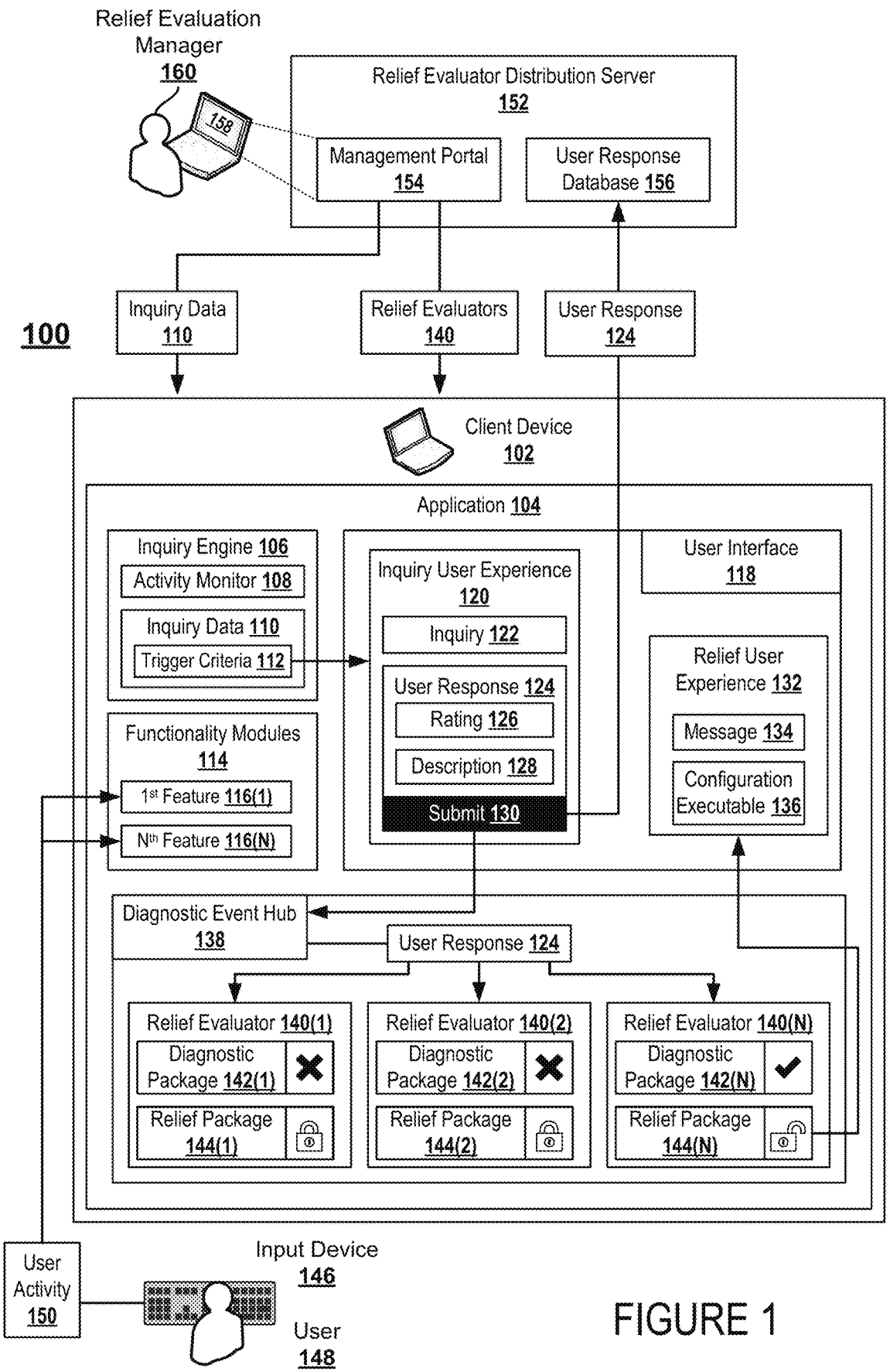
FIG. 1 illustrates an exemplary system for enabling a client device to analyze a user response that is submitted in response to an inquiry to locally diagnose (i.e., diagnose at the client device) a performance issue that is being reported in the user response.

The following Detailed Description describes technologies that enable a system to analyze a description of a performance issue that is submitted in response to an inquiry to expediently diagnose and mitigate the performance issue locally at a client device. Generally described, embodiments enable a client device to expose inquiries associated with various features of an application. Then, when user responses to the inquiries are submitted, the client device provides the user responses to relief evaluators that analyze the user responses to diagnose performance issues that a user reports in association with the various features.

The relief evaluators include diagnostic packages that diagnose predetermined performance issues by analyzing individual user responses as they are submitted in response to specific inquiries. As an example, if a user response includes a description of a particular performance issue "symptom," a diagnostic package may analyze the description to identify the particular performance issue "symptom" that is being reported. It can be appreciated that under some circumstances a particular performance issue "symptom" may be known to result from a predetermined system state of the application and/or a client device running the application. Stated alternatively, the predetermined system state may be a known "cause" of the particular performance issue "symptom." For this reason, the diagnostic package may be further designed to determine whether a current system state of the application and/or client device matches the predetermined system state and, therefore, is the likely performance issue "cause" of the particular performance issue "symptom" being reported.

The relief evaluators also include relief packages that mitigate the predetermined performance issues. In some embodiments, a relief package may be designed to mitigate the predetermined performance issue by displaying a message that informs the user how to appropriately adjust the system state to prevent the performance issue "symptom" from reoccurring. Additionally, or alternatively, a relief package may be designed to mitigate the performance issue by automatically adjusting the system state to prevent the performance issue "symptom" from reoccurring. In this way, performance issues can be expediently mitigated without having to transmit user responses to external resources and without forcing users to endure the performance issue while the user responses are reactively analyzed and acted upon. It can be appreciated therefore that the techniques described herein improve user interaction with a computing device by expediently performing a local performance issue diagnosis and mitigation procedure to reduce the amount of time a user must endure a performance issue "symptom" after having reported it. Furthermore, since by prestaging the relief evaluators at the client device, the client device is enabled to perform diagnosis and mitigation of performance issues even absent an internet connection.

Turning now to FIG. 1, illustrated is an exemplary system 100 for enabling a client device 102 to analyze a user response 124 that is submitted, via the client device 102, in response to an inquiry 122. By locally analyzing the user response 124 upon submission, the client device 102 is able to independently (e.g., without reliance on external resources) diagnose and mitigate a performance issue being that is being reported in the user response 124. As a specific example, analyzing the user response 124 using natural language processing techniques may reveal a performance issue "symptom" that the user has reported. Then, analyzing the current system state of the client device (and/or an application running thereon) may reveal a performance issue "cause" that is known to cause the reported "symptom." Ultimately, by locally identifying the symptom and/or cause of the performance issue at the client device 102, the performance issue can be mitigated without reliance on external resources such as, for example, web-based technical support services—resulting in a significant decrease in the network bandwidth consumed to mitigate the performance issues reported via client devices.

In the illustrated embodiment, the client device 102 includes an application 104 installed for operation thereon. For example, the application 104 may be a client application (e.g., EXCEL and/or WORD by MICROSOFT, PAGES and/or NUMBERS by Apple, Inc.) that is installed onto the client device 102 and can be run at the client device 102 by an operating system. As another example, the application 104 may be a server application (e.g., GOOGLE DOCS and/or GOOGLE SHEETS) that is accessible at the client device 102 via a web portal (not shown in FIG. 1). Although illustrated as a "laptop" style computing device, the client device 102 may be any other suitable computing device such as, for example, a desktop computer, a tablet computer, a smart phone, etc.

In some embodiments, the client device 102 includes an inquiry engine 106 for determining when particular inquiries should be exposed (e.g., graphically displayed, audibly played, etc.) to a user 148 when corresponding trigger criteria 112 are satisfied. The inquiry engine 106 has access to inquiry data 110 that is stored on the client device 102 and that defines individual inquiries that are to be exposed to the user 148 at various times and/or in various contexts. The inquiry data 110 may be transmitted to the client device 102 from a relief evaluator distribution server 152. For example, a relief evaluation manager 160 can utilize a computer 158 to log into a management portal 154 (e.g., by entering user credentials) to select the inquiry data 110 that is to be transmitted to the client device 102. In this way, developers can create and deploy new inquiries to the client device 102 even after the application 104 is loaded thereon. Additionally, or alternatively, the inquiry data 110 may be coded into the application 104 at the time of the application 104 being initially installed on the client device 102.

The inquiry data 110 may define trigger criteria 112 for individual inquiries so that inquiries are exposed to the user 148 in an appropriate context. For example, the time at which an inquiry 122 is exposed may be controlled so that feedback is solicited from a user 148 while the users' experiences with some specific functionality remain fresh in their memories. To illustrate this point, presume that the application 104 includes a plurality of functionality modules 114 that facilitate utilization of a variety of features 116 of the application 104 by the user 148. As used herein, the term "functionality module" may refer generally to a portion of software code that enables one or more features 116 of the application 104 to function. Exemplary features 116 include, but are not limited to, a modification tracking feature that enables the user 148 to edit a document in a marked-up format, a comment feature that enables the user 148 to attach comments to specific portions of a document, an at-mentioning "@mentioning" feature that enables the user 148 to direct comments and/or questions toward specific users based on their email aliases, and any other feature that is suitable for being performed by a "software" application 104.

The inquiry engine 106 may include an activity monitor 108 for monitoring user activity 150 that occurs in association with the application 104. For example, the user 148 may perform user activity 150 via an input device 146 (e.g., a keyboard, a mouse, a touchscreen, a microphone, or any other suitable input component) to utilize the various features 116 of the application 104. The activity monitor 108 may monitor the user activity 150 to determine when particular trigger criteria 112 have been satisfied for any particular inquiry 122. Exemplary trigger criteria 112 may include, but are not limited to, various forms of user activity 150 that is prescribed to trigger exposure of an inquiry 122. In response to the particular trigger criteria 112 being satisfied, the inquiry engine 106 may cause the particular inquiry 122 to be exposed (e.g., displayed). For example, a particular inquiry 122 that solicits feedback with respect to a $1^{st}$ feature 116(1) that has been recently added to the application 104 can be exposed immediately after the $1^{st}$ feature 116(1) is used for the first time. In this way, feedback is solicited while the users' initial experiences with the $1^{st}$ feature 116(1) remain fresh in his or her memories.

As illustrated, the application 104 may include a corresponding user interface (UI) 118 that enables the user 148 to interact with the application 104. For example, the user interface 118 may enable various aspects of the application 104 to be displayed to the user 148 in the form of an operating system window via a display (e.g., a Liquid-Crystal-Display Monitor) of the client device 102. Exposure of the inquiry 122 to the user 148 may include causing one or more questions associated with the inquiry 122 to be displayed to the user 148, via an inquiry user experience 120, to solicit feedback in the form of a user response 124.

As used herein, the term "inquiry user experience" generally refers to any computing experience that is perceptible to the user 148 and suitable for soliciting feedback of any type from the user 148. An exemplary inquiry user experience 120 includes displaying a pop-up survey on a display of the client device 102. The inquiry user experience 120 may present/display questions to the user 148 to inquire about his or her experience with various features 116 of the application 104. The inquiry user experience 120 may also include one or more user interface elements for the user 148 to provide feedback through. Any other type of user experience that is suitable for attracting the user's attention to solicit user feedback, whether currently known or subsequently developed, is also contemplated and within the scope of the present disclosure.

The inquiry user experience 120 enables the user 148 to provide various types of feedback in response to the particular inquiry 122 that is being exposed. For example, the inquiry user experience 120 may prompt the user 148 to provide a rating 126 in response to aspects of the particular inquiry 122. The rating 126 that is solicited from the user 148 may be based on a predetermined scale such as, for example, a scale from one-star to five-stars where a one-star rating indicates strong user dissatisfaction and a five-star rating indicates strong user satisfaction. In such instances, the inquiry user experience 120 may include a sequence of user interface elements that individually correspond to the different potential ratings of the predetermined rating scale. As described in more detail below, the user interface elements may be in the form of individually selectable "buttons" where each individual button corresponds to an individual rating of the predetermined rating scale.

Additionally, or alternatively, the inquiry user experience 120 may enable the user 148 to respond to the particular inquiry 122 by providing a description 128 of his or her experience with the application 104 and/or specific features 116 thereof. As a specific but nonlimiting example, the inquiry user experience 120 may cause a text-box user interface element to be displayed to the user 148. The text-box user interface element may enable the user 148 to type and/or dictate a description 128 of aspects of a performance issue that he/she has experienced while using a feature 116 of the application 104. To illustrate this point, suppose that the particular inquiry 122 solicits open-ended feedback from the user 148 in association with a "Track-Changes" feature of the application 104. For example, the inquiry user experience 120 might render an open-ended question directly above a text-box user interface element. An exemplary open-ended question might be rendered as text that recites: "Hello, we've noticed that you've used Track-Changes recently. Is there anything we can do to improve how Track-Changes is working for you?" Under these circumstances, the user 148 might respond with a description 128 that expressly states: "I'm having frustrations with Track-Changes. It was working well for a while but then stopped working about a week ago."

The inquiry user experience 120 may also include a "submit" button 130 that the user 148 can select to provide a submission of the rating 126 and/or the description 128. In response to the user 148 submitting the user response 124, the user response 124 may be provided to multiple different relief evaluators 140. As used herein, the term "relief evaluator" may generally refer to a multipart software package that is specifically designed to both (i) diagnose a predetermined performance issue by analyzing user responses 124, and (ii) mitigate the predetermined performance issue by executing a predetermined form of relief. As illustrated, for example, each individual relief evaluator 140 includes a corresponding diagnostic package 142 that is executable to diagnose a specific predetermined performance issue. Diagnosing the specific predetermined performance issue may include identifying a specific performance issue "symptom" that is being reported and, then based thereon, identifying a corresponding performance issue "cause" that currently exists on the client device 102 and is a known "cause" of the reported "symptom." As further illustrated, for example, each individual relief evaluator 140 includes a corresponding relief package 144 that is executable to at least partially relieve the user 148 of whatever frustration (e.g., user dissatisfaction) results from the performance issue.

The multiple different relief evaluators 140 may be received from one or more resources that are external to the client device 102. In the illustrated example, the relief evaluators 140 are received from the relief evaluator distribution server 152. Different relief evaluators 140 may be received at different times and, upon being received at the client device 102, may be stored in a diagnostic event hub 138 that broadcasts user responses 124 to the multiple different relief evaluators 140. In this way, as developers become aware of a "new" performance issue that is plaguing various users of the application 104, the developers can create a corresponding "new" relief evaluator 140 that is specifically designed to diagnose the "new" performance issue by continuously analyzing the user responses 124 and/or continuously checking a system state of the client device 102 and/or application 104. Then, once an occurrence of the "new" performance issue is reported and diagnosed at a client device, the corresponding "new" relief evaluator 140 mitigates each "new" performance issue as described herein.

It should be appreciated that the techniques described herein enable the relief evaluators 140 to be preemptively staged in the diagnostic event hub 138, at the client device 102, before exposure of the particular inquiry 122 is even triggered. Then, when the particular inquiry 122 is later exposed and the user response 124 is submitted in response thereto, the diagnostic event hub 138 may respond by broadcasting the user response 124 to the multiple different relief evaluators 140 which have already been preemptively staged on the client device 102. Thus, the relief evaluators 140 are preemptively staged on the client device 102 to expediently and independently diagnose and mitigate multiple predetermined performance issues—if and when they subsequently occur and are reported at the client device 102.

In some implementations, the diagnostic event hub 138 may selectively broadcast the user responses 124 to individual relief evaluators 140 based on the rating 126 that is provided in the user responses 124. For example, a particular relief evaluator 140 may include an indication of a threshold rating above which analysis of a user response is not desired. In this example, the diagnostic event hub 138 providing user responses 124 to that particular relief evaluator 140 may be preconditioned on those user responses 124 including a rating 126 that is equal to or less than the threshold rating. As a specific but nonlimiting example, providing the user response 124 to one or more of the first relief evaluator 140(1) through the Nth relief evaluator 140(N) may be preconditioned on the rating 126 provided by the user 148 being two-stars or less out of a possible five-star rating. In this way, the processing resources such as processing cycles and/or memory usage that are consumed when the diagnostic packages 142 analyze the user responses 124 will only be consumed in the event that the user 148 reports dissatisfaction with the application 104 and/or a specific feature 116 thereof.

In the illustrated example, the diagnostic event hub 138 is broadcasting the user response 124 to each of the first relief evaluator 140(1) through the Nth relief evaluator 140(N). As described above, in various implementations, the individual relief evaluators 140 may include both a corresponding diagnostic package 142 for diagnosing a predetermined performance issue and also a corresponding relief package 144 for mitigating the predetermined performance issue. It should be appreciated therefore that each individual relief evaluator 140 may correspond to a specific predetermined performance issue "symptom"/"cause" combination that is both (i) readily diagnosable in the sense that a developer may understand specific "causes" of the performance issue "symptom" and (ii) readily mitigatable in the sense that a developer may understand how to prevent future occurrences of the performance issue "symptom" and/or provide the user 148 with an explanation of why the performance issue "symptom" occurs.

As used herein, the term "performance issue symptom" generally refers to user discernable presence or absence of a computing functionality with respect to one or more features of a software application. An exemplary performance issue symptom may be that a particular feature of an application has abruptly and inexplicably ceased to function as it previously did (e.g., a Track-Changes feature may become disabled due to a license expiration). Another exemplary performance issue symptom may be that a particular feature of an application is not functioning as expected by a user—which may or may not be functioning as intended by a software developer.

As used herein, the term "performance issue cause" generally refers to a computer detectable system state of a client device (e.g., in terms of user registries, system settings, library installations and/or permissions, driver versions, etc.) and/or an application (e.g., application permissions, application license status, etc.) that results in a performance issue symptom. An exemplary performance issue cause may be that a product license for an application has recently expired—the result being that one or more features of the application have become disabled.

As an illustrative scenario to convey inventive concepts described herein, presume that a software developer who is responsible for the 1$^{st}$ feature 116(1) has knowledge that a particular system state of the application 104 and/or computing device 102 has caused in the past and will cause in the future a specific performance issue "symptom" to occur in association with the 1$^{st}$ feature 116(1). For example, the software developer may have intentionally designed the 1$^{st}$ feature 116(1) to become disabled if and when a product license associated with the application 104 becomes expired. Further presume that the particular inquiry 122 asks the user 148 about his or her experience with the 1$^{st}$ feature 116(1) and the user response 124 indicates that the 1$^{st}$ feature 116(1) inexplicitly stopped working last week. For example, as described above, the particular inquiry 122 may ask the user 148 about a Track-Changes feature to which the user 148 might respond with a description 128 that expressly states:

"I'm having frustrations with Track-Changes. It was working well for a while but then stopped working about a week ago."

In this scenario, a diagnostic package 142 may analyze the description 128 using one or more natural language processing techniques to determine that the user 148 is complaining of the 1$^{st}$ feature 116(1) ceasing to function last week. In some embodiments, one or more diagnostic packages 142 may be designed to analyze the description 128 by leveraging one or more artificial intelligence (AI) techniques to parse a natural language description of the performance issue symptom. For example, the diagnostic packages 142 may parse one or more sentences, that the user 148 provides in the description 128, into grammatical components. Then, based on these identified grammatical components, the diagnostic packages 142 may determine the particular performance issue symptom that is being reported. For example, one or more diagnostic packages 142 may leverage Natural-Language-Understanding (NLU) techniques to analyze the sentence: "I'm having frustrations with Track-Changes. It was working well for a while but then stopped working about a week ago." In this specific example, the NLU-based analysis may reveal that the reported performance issue symptom is the Track-Changes feature has become inoperable. Additionally, or alternatively, one or more diagnostic packages 142 may be designed to analyze the description 128 using Structured Query Language (SQL) techniques to determine parse input that the user 148 provides in the description 128.

Individual relief evaluators 140 may correspond to a specific performance issue symptom/performance issue cause combination. Thus, in addition to analyzing the description 128 to determine that the specific performance issue symptom the user 148 is reporting is the same specific performance issue symptom that a particular diagnostic package 142 is designed to mitigate, that particular diagnostic package 142 may also confirm the performance issue cause that is causing the reported performance issue symptom. The importance of confirming the performance issue cause should be appreciated because in some instances a particular performance issue symptom may have a multitude of potential causes. Under these circumstances where a reported performance issue symptom has multiple potential causes, then reliably mitigating the performance issue may depend on successfully identifying which potential cause is currently causing the reported performance issue symptom.

In the illustrated example, the Nth diagnostic package 142(N) has been satisfied and, as a result, the Nth relief package 144(N) has been unlocked to cause execution of an Nth relief user experience 132. In contrast, neither of the first diagnostic package 142(1) nor the second diagnostic package 142(2) have been satisfied, as a result, none other their corresponding relief packages 144 have been unlocked.

As illustrated, execution of the Nth relief package 144(N) results in a corresponding relief user experience 132 that is designed to at least partially mitigate the "pain" (e.g., user dissatisfaction) that is felt by the user 148 as a result of the diagnosed performance issue symptom/performance issue cause combination. For example, suppose that the reported performance issue symptom is determined to be that the first feature 116(1) has inexplicably stopped working and the identified performance issue cause is that the product license has become expired. In this case, the relief user experience 132 may include causing a message 134 to be displayed that informs the user 148 that the first feature 116(1) has been disabled temporarily because of the product license expiration. In this way, the frustration felt by the user 148 due to the lack of understanding of why the performance issue symptom was occurring is alleviated because now the user 148 at least understands the cause of the reported symptom. In some instances, the message 134 may include one or more user interface elements that enable the user 148 to "fix" the performance issue cause. For example, in the scenario where the user's pain is caused by the license expiration, the relief user experience 132 may provide the user 148 with an option to immediately remedy the performance issue by renewing the product license.

In some implementations, execution of the relief user experience 132 may include running a configuration executable to alter a current system state of the computing device 102 and/or application 104 so that the reported performance issue symptom is not caused in the future. For example, consider a scenario in which the reported performance issue symptom is that an at-mentioning feature of a word processing application is not sending notifications to mentioned persons as expected by the user 148. Further suppose that a network permissions setting of the word processing application by default prevents the word processing application from transmitting data over the Internet. Thus, based on the default network permissions setting, the word processing application is not permitted to implement the at-mentioning feature. In this example, a diagnostic package 142 may analyze a user response 124 to identify a reported symptom and then may further analyze the current system state of the word processing application to identify the cause as being the default network permissions setting restricting network access. Then, the diagnostic package 142 being satisfied may trigger execution of a corresponding relief package 144 that includes a configuration executable 136 that automatically changes the network permissions setting so that the at-mentioning feature becomes functional. It can be appreciated that in some implementations, the user 148 may be asked to give permission to make changes prior to the relief package making any changes to system settings such as the network permissions setting.

In some embodiments, in the event that multiple individual diagnostic packages 142 are satisfied upon analyzing the user response 124 and/or system state of the client device and/or application 104, one or more tie-breaking techniques may be utilized to determine which relief package to execute. For example, in some cases a simple probability model can be used to "roll the dice" to select which relief package to execute. In other implementations, the individual relief evaluators may be prescribed a priority within an ordered ranking so that if two or more diagnostic packages are concurrently satisfied the ordered ranking dictates which corresponding relief package is to be executed.

Figure 2:
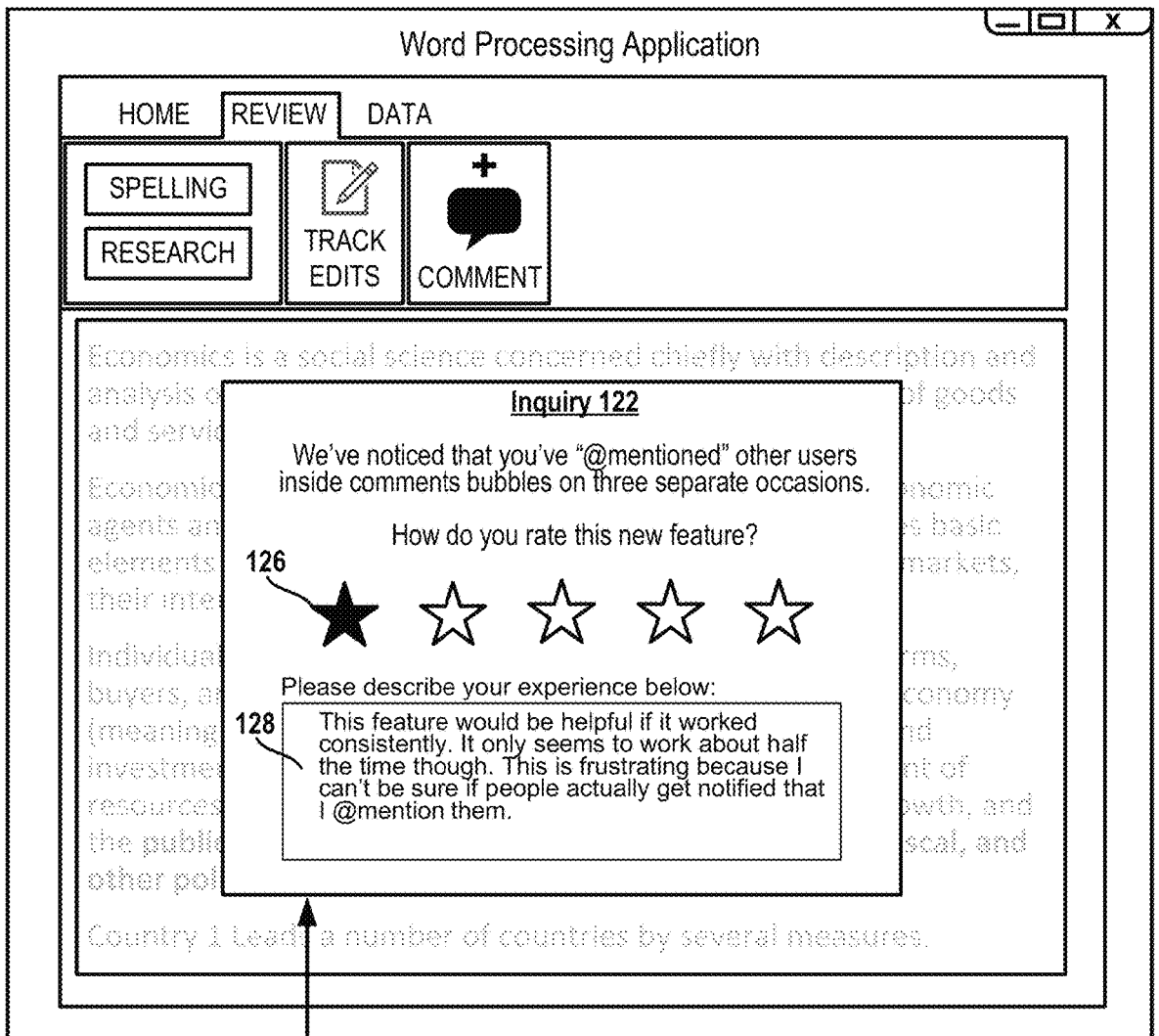
FIG. 2 illustrates an exemplary scenario of a diagnostic package leveraging a natural language understanding model to analyze a description of a performance issue that is provided by a user in response to an inquiry.
Figure 2:
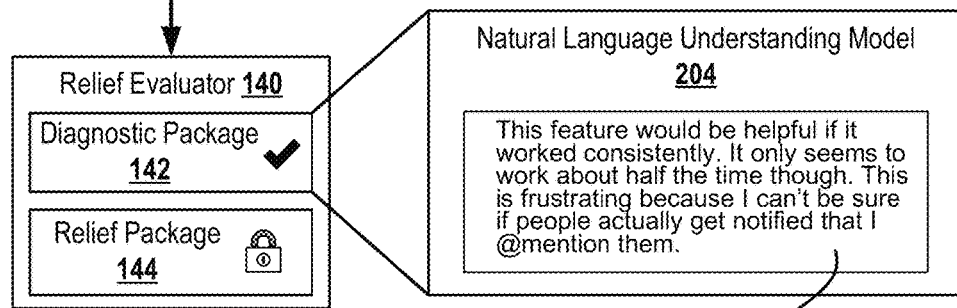

Turning now to FIG. 2, illustrated is an exemplary scenario 200 of a diagnostic package 142 leveraging a natural language understanding model 204 to analyze a description 128 of a performance issue that is provided by a user in response to an inquiry 122. Although shown in the form of a "pop-up" survey, it can be appreciated that the exemplary inquiry 122 is shown for illustrative purposes only and that numerous other types of inquiries are within the scope of the present disclosure. As illustrated, the inquiry 122 is being displayed to the user in response to particular trigger criteria being met. More specifically, the inquiry 122 is being displayed in response to the user having used an "@mentioning" feature in a particular way for a third time.

As illustrated, the user is responding to the inquiry 122 by providing both of a rating 126 of subject feature and also a description 128 of a performance issue that has been experienced with respect to the subject feature. As described above, in various embodiments, the user responses to inquiries may be selectively broadcasted to one or more relief evaluators when the rating 126 that is provided by the user is below a threshold rating. For example, as illustrated, the user has responded to the inquiry 122 with a one-star rating out of a possible five-stars which is clearly indicative that the user is dissatisfied with the subject feature that the inquiry 122 is soliciting feedback on. For purposes of FIG. 2, presume that a threshold rating of two-stars has been set in association with the illustrated relief evaluator 140 so that user responses that include a rating of two-stars or less are broadcasted to the relief evaluator 140 whereas user responses that include a rating of three-stars or higher are not broadcasted to the relief evaluator 140.

In this way, the processing resources such as processing cycles and/or memory usage that are consumed when the diagnostic packages analyze the user responses are only consumed when the user reports dissatisfaction in response to an inquiry. In the illustrated scenario 200, the rating 126 being a one-star rating has resulted in at least some of the user response being provided to the relief evaluator 140. Upon receiving the user response, the relief evaluator 140 deploys a diagnostic package 142 to analyze the description 128 of the performance issue. As described above, the diagnostic packages 142 may analyze the description 128 using a variety of language processing techniques.

In the illustrated example, the diagnostic package 142 is shown to be leveraging a natural language understanding model 204 to identify the performance issue symptom being reported by the user. The natural language understanding model 204 may be an artificial intelligence (AI) resource that provides the diagnostic package 142 with reading compression abilities. The natural language understanding model 204 may include one or more natural language processing algorithms for parsing the description 128 into constituent grammatical parts. Then, based on the identified constituent grammatical parts, the diagnostic package 142 deploys the natural language understanding model 204 to determine a grammatical intent of the user. Stated alternatively, the diagnostic package 142 uses the natural language understanding model 204 to analyze the description 128 in order to determine the performance issue symptom that the user is intending to report. In the illustrated example, the diagnostic package 142 may analyze the description 128 to determine that the user is reporting a performance issue symptom of the new "@mentioning" feature working intermittently.

As described above, in various embodiments, upon determining a performance issue symptom that is reported in a user response to an inquiry 122, the diagnostic package 142 may then analyze a current system state of the application 104 and/or the client device 102 to identify a cause of the reported symptom. Then, if the identified symptom and cause match the specific performance issue symptom/performance issue cause combination that the relief evaluator 140 is designed to mitigate, then the relief package 144 is executed.

Figure 3:
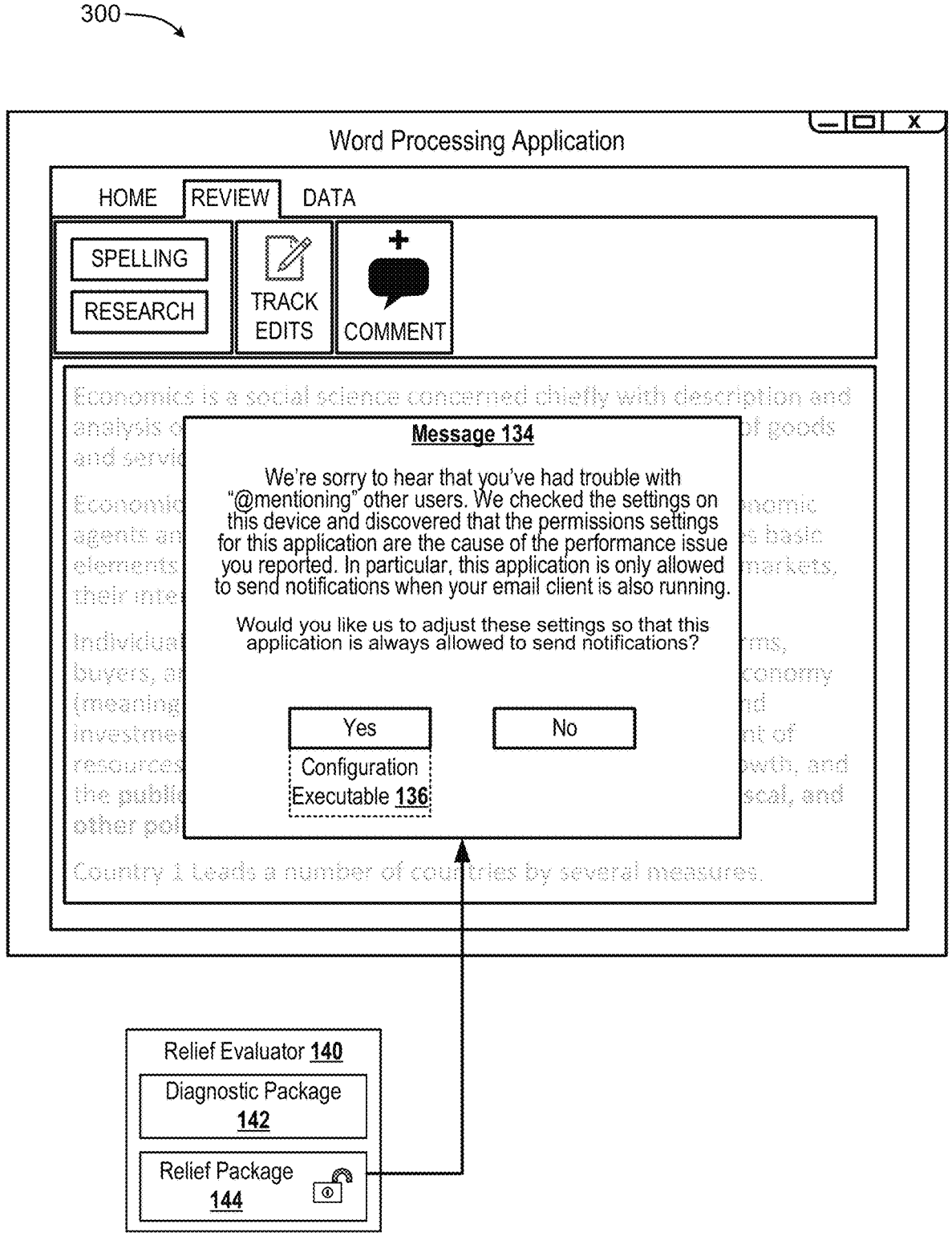
FIG. 3 illustrates an exemplary scenario of a relief package being executed in response to a diagnostic package being satisfied at a client device.

Turning now to FIG. 3, illustrated is an exemplary scenario 300 of a relief package 144 being executed in response to a diagnostic package 142 being satisfied at a client device. Execution of the relief package 144 may result in a message 134 being displayed to the user to inform the user as to the specific performance issue "cause" of the reported performance issue "symptom." For example, as illustrated, the message 134 is designed to inform the user that the permissions settings for the application 104 restrict the application 104 from sending notifications unless an email client is concurrently running on the client device 102.

In some implementations, mitigation of the performance issue may be accomplished simply by displaying the message 134 to educate the user as to the cause of the reported symptom. For example, in the present example that is being described in relation to FIGS. 2 and 3, it can be appreciated that a substantial amount of user dissatisfaction could result simply from the user's lack of understanding of why the application 104 was behaving as reported. That is, the description 128 provided by the user includes a clear indication that the user is unaware as to why the "@mentioning" feature in some instances causes notifications to be sent and in other instances does not send notifications. However, simply informing the user that the email client needs to be running along with the application in order to facilitate the desired functionality may alleviate the pain caused by the user's lack of knowledge as to the cause. For example, upon being informed what is causing the pain, anytime in the future when the user wants to use the "@mentioning" feature he or she can simply open up the email client on the client device.

In some implementations, execution of the relief package 144 may result in a configuration executable being run at the client device 102 in order to adjust a system state that is causing the performance issue symptom. For example, as illustrated, the message 134 provides the user with an option of whether or not to run a configuration executable 136 that is specifically designed to adjust the permissions settings that are the root cause of the reported performance issue symptom. In this example, if the user selects the "Yes" button then the configuration executable 136 will be run and the permissions settings will be adjusted so that the application is enabled to send notifications always—regardless of whether the email client is open. Alternatively, the execution of the relief package 144 may result in the configuration executable being automatically run (e.g., without first requiring the user's permission).

Figure 4:
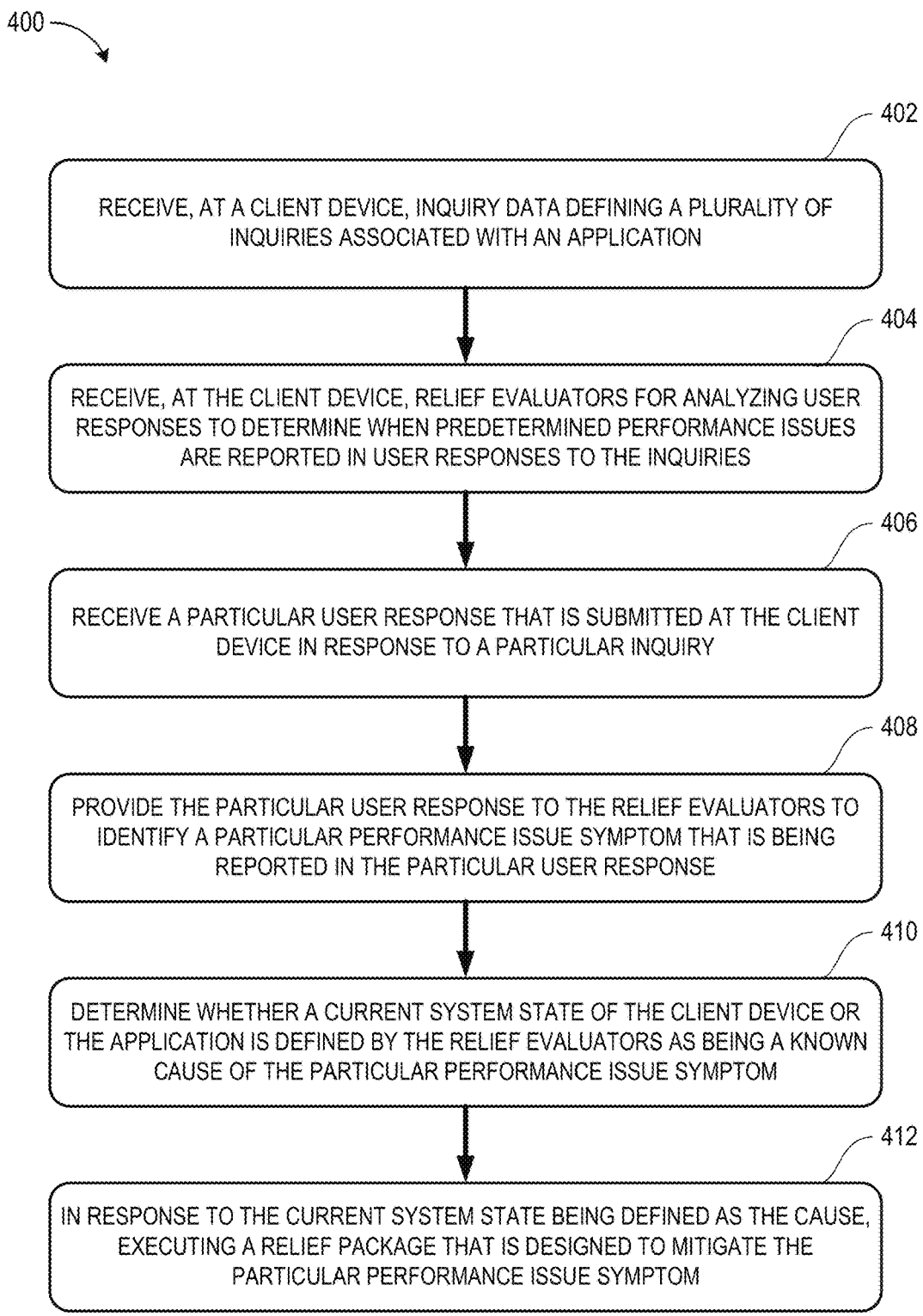
FIG. 4 illustrates an example method for determining whether a current system state of a client device or an application is a cause of a performance issue symptom that is being reported in response to an inquiry.
Figure 5:
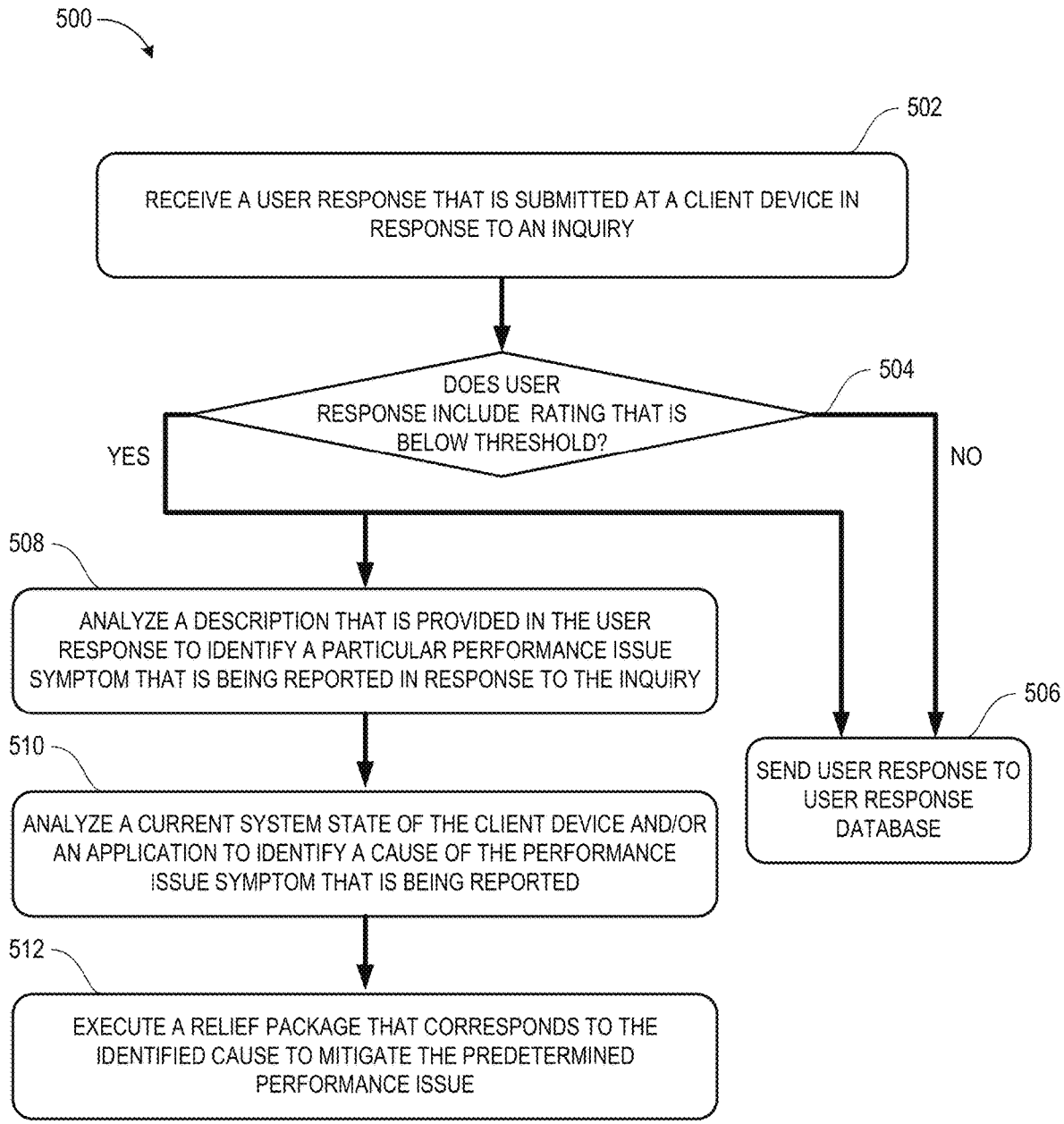
FIG. 5 illustrates an example method for selectively analyzing only those user responses that include ratings that are below a threshold rating to mitigate reported performance issue symptoms.

FIGS. 4 and 5 are flow diagrams of example methods for performing various techniques as described herein. The processes 400 and 500 are described with reference to FIGS. 1-3. The processes 400 and 500 are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 4, illustrated is an example method 400 for determining whether a current system state of a client device or an application is a cause of a performance issue symptom that is being reported in response to an inquiry.

At block 402, inquiry data that defines a plurality of inquiries associated with an application may be received at a client device. As described above, the inquiry data may define questions to be presented to users when predetermined trigger criteria are met. The inquiry data may further define trigger criteria that define user activity to trigger exposure of individual inquiries. For example, an inquiry that solicits feedback associated with a specific feature may have corresponding trigger criteria to cause exposure of the individual inquiry immediately following the fifth time the specific feature is used. In this way, feedback is solicited only after a user has become familiar with the specific feature and also while the user's experience with the specific feature remains fresh in his or her memory.

At block 404, one or more relief evaluators are received at the client device. Individual ones of the relief evaluators are configured to analyze user responses to the inquiries to identify when predetermined performance issues are reported. In some embodiments, the individual relief evaluators may include a corresponding diagnostic package that is configured to diagnose a specific performance issue symptom/cause combination. For example, the diagnostic packages may be configured to analyze feedback that is provided in a user response to determine a specific predetermined performance issue symptom that a user is reporting. The diagnostic packages may be further configured to determine whether a specific predetermined performance issue cause is the current cause of the reported performance issue symptom.

The relief evaluators may be pre-staged at the client device so that immediately upon a user submitting a user response to an inquiry, the user response can be immediately analyzed by the relief evaluators at the client device. In this way, the user responses need not be transmitted over the internet to any external servers for analysis prior to relief being provided to the users.

At block 406, a particular user response that is submitted in response to an inquiry is received at the client device. For example, an inquiry may be exposed in response to the user performing some type of predetermined user activity. The inquiry may be exposed via an inquiry user interface through which the user is able to read a question being asked about a feature of the application. The inquiry user interface may also enable the user to generate and submit the particular user response. In various implementations, the user response may include a rating of the application and/or a feature thereof. Additionally, or alternatively, the user response may include a description of a performance issue symptom that is being and/or has been experienced by the user at the client device.

At block 408, the particular user response is provided to the relief evaluators so that the particular performance issue symptom that is being reported can be identified. For example, the relief evaluators may be configured to deploy one or more natural language processing techniques to analyze a natural language description of the performance issue symptom that is typed and/or dictated by the user when generating the user response. As another example, the inquiry may provide a listing of one or more known performance issue symptoms and the user response may include a selection of a particular performance issue symptom from the listing.

At block 410, a determination may be made as to whether a current system state of the client device and/or the application is defined by the relief evaluators as being a known cause of the particular performance issue symptom that is being reported in the user response. For example, the relief evaluators and/or diagnostic packages thereof may access one or more system settings of the client device and/or application to determine whether the system settings define a current system state that causes the reported performance issue symptom. Additionally, or alternatively, the relief evaluators and/or diagnostic packages thereof may determine a licensing status of the application to determine whether an expired license is the cause of the reported performance issue symptom.

At block 412, a particular relief package that is designed to mitigate the reported performance issue symptom when caused by the known cause (e.g., the current system state) may be executed. In some instances, the particular relief package mitigates the reported performance issue symptom by displaying a message that informs the user how to adjust the system state to prevent the performance issue symptom from reoccurring. Additionally, or alternatively, the particular relief package may mitigate the reported performance issue symptom by automatically adjusting the system state (e.g., to prevent future occurrences of the reported performance issue symptom).

Thus, in the event that a user reports a particular performance issue while the current system state matches the predetermined system state that is known to cause the particular performance issue, the system may expediently execute a specific relief package that mitigates the performance issue. Furthermore, in various implementations, both of the diagnostic package and the relief package can be executed locally on a user's client device. In this way, performance issues can be expediently mitigated without having to transmit user responses to external resources and without forcing users to endure the performance issue while the user responses are reactively analyzed and acted upon.

Turning now to FIG. 5, illustrated is an example method 500 for selectively analyzing only those user responses that include ratings that are below a threshold rating to mitigate reported performance issue symptoms.

At block 502, a system (e.g., a client device) receives a user response that is submitted in response to an inquiry. For example, user activity may trigger an inquiry to be exposed at the client device. Then, upon reading the inquiry, a user may respond to the inquiry by providing a rating and a description of a performance issue symptom.

At block 504, a determination may be made as to whether the rating that is provided by the user in the user response is below some threshold. For example, the inquiry may enable the user to provide a rating based on a predetermined scale from one-star to five-stars and a threshold may be defined as a two-star rating.

In this example, if the user provides a three-star rating in the user response, then the process 500 continues from block 504 to block 506 where the user response is sent to a user response database. The user response database may be an external data store that the client device transmits the user response to over the internet. Then, at some later time, the user response may be accessed by developers for a variety of reasons.

In contrast, if the user provides a two-star rating (or lower) in the response, then the process 500 continues from block 504 to block 508 where the description that is provided in the user response is analyzed to identify any specific performance issue symptom(s) that is/are being reported in the user response to the inquiry. For example, as described above, the client device may provide the user response to a plurality of relief evaluators that are pre-staged on the client device prior to the user response being submitted. Then, the plurality of relief evaluators may use a natural language understanding model to analyze the description provided in the user response to determine what specific performance issue symptom the user is intending to describe.

In some implementations, user responses that include ratings that are equal to or below the threshold are also sent to a user response database. For example, as illustrated, the process 500 is designed such that user responses having ratings below the threshold rating are sent to the user response database in accordance with block 506 in addition to having the description analyzed at block 508.

At block 510, a current system state of the client device and/or the application is analyzed to identify a cause of the performance issue symptom that is being reported. For example, as described above, the relief evaluators and/or diagnostic packages thereof may access one or more system settings of the client device and/or application to determine whether the system settings define a current system state that causes the reported performance issue symptom. Additionally, or alternatively, the relief evaluators and/or diagnostic packages thereof may determine a licensing status of the application to determine whether an expired license is the cause of the reported performance issue symptom.

At block 512, a particular relief package that is designed to mitigate the reported performance issue symptom when caused by the known cause (e.g., the current system state) may be executed. In some instances, the particular relief package mitigates the reported performance issue symptom by displaying a message that informs the user how to adjust the system state to prevent the performance issue symptom from reoccurring. Additionally, or alternatively, the particular relief package may mitigate the reported performance issue symptom by automatically adjusting the system state (e.g., to prevent future occurrences of the reported performance issue symptom).

Figure 6:
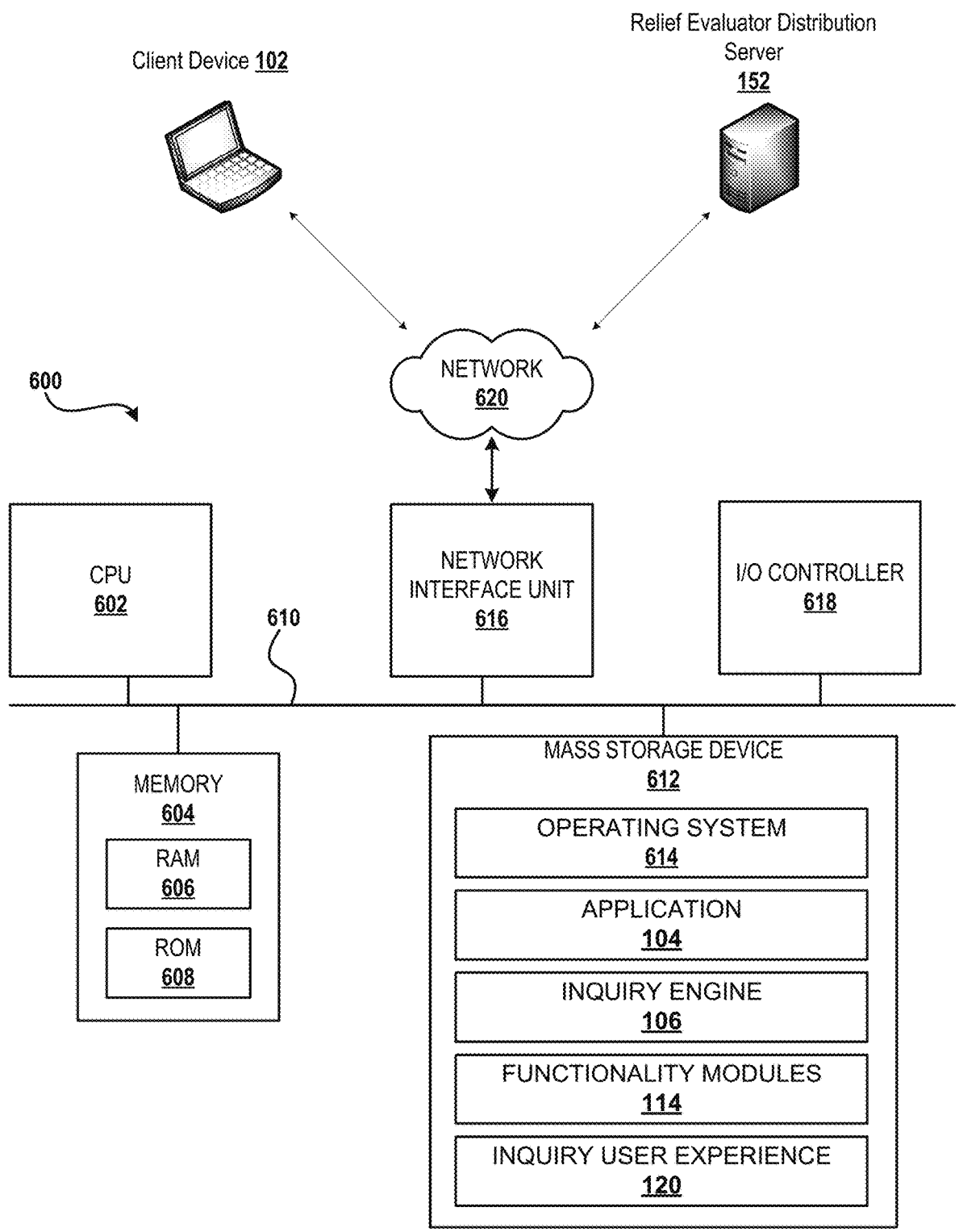
FIG. 6 shows additional details of an example computer architecture for a computer capable of executing the techniques disclosed herein.

FIG. 6 shows additional details of an example computer architecture 600 for a computer capable of executing the application 104, the inquiry engine 106, the inquiry user experience 120, the functionality modules 114, and/or any program components thereof as described herein. Thus, the computer architecture 600 illustrated in FIG. 6 illustrates an architecture for a client device, a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the application 104, the inquiry engine 106, the inquiry user experience 120, and/or the functionality modules 114.

The mass storage device 612 is connected to the CPU 602 through a mass storage controller (not shown in FIG. 6) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various techniques, the computer architecture 600 may operate in a networked environment using logical connections to remote computers through a network 620 and/or another network (not shown in FIG. 6). The computer architecture 600 may connect to the network 620 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 620 through a network interface unit 616, the computing architecture may enable the client device 102 to communicate with the relief evaluator distribution server 152.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

EXAMPLE CLAUSES

The disclosure presented herein may be considered in view of the following clauses.

Example clause A, a client device, comprising: one or more processors; a memory in communication with the one or more processors, the memory having computer-readable instructions stored thereupon which, when executed by the one or more processors, cause the client device to: receive inquiry data defining a plurality of inquiries that are associated with an application, wherein the inquiry data defines trigger criteria for triggering exposure of individual inquiries via an inquiry user interface; monitor, based on the trigger criteria, user activity to determine when the user activity satisfies particular trigger criteria for a particular inquiry; responsive to the user activity satisfying the particular trigger criteria, cause exposure of the particular inquiry via the inquiry user interface; receive a user response that is submitted, via the inquiry user interface, by a user in response to the particular inquiry, wherein the user response includes a description of a performance issue associated with the application; provide the user response to a plurality of relief evaluators to trigger analysis of the description of the performance issue with respect to a plurality of diagnostic packages, wherein individual diagnostic packages correspond to individual relief packages for mitigating predetermined performance issues; and based at least in part on the description of the performance issue satisfying a particular diagnostic package, execute a particular relief package that corresponds to the particular diagnostic package to mitigate the performance issue associated with the application.

Example clause B, the client device of Example clause A, wherein the computer-readable instructions further cause the client device to: determine a rating that is submitted in association with the user response; and provide the description of the performance issue to the plurality of relief evaluators in response to the rating being less than or equal to a threshold rating.

Example clause C, the client device of any one of Example clauses A through B, wherein the description of the performance issue is a natural language input that is generated by the user, via a user input device, in association with the inquiry user interface.

Example clause D, the client device of any one of Example clauses A through C, wherein executing the particular relief package causes the client device to display a message that describes a cause of the performance issue.

Example clause E, the client device of any one of Example clauses A through D, wherein executing the particular relief package includes causing the client device to run a configuration executable that is configured to adjust one or more system parameters to prevent further occurrences of the performance issue at the client device.

Example clause F, the client device of any one of Example clauses A through E, wherein the computer-readable instructions further cause the client device to determine whether a current system state of at least one of the client device or the application corresponds to a predetermined system state that is defined within the particular diagnostic package as being a cause of the performance issue.

Example clause G, the client device of any one of Example clauses A through F, wherein the executing the particular relief package is in response to a current system state of at least one of the client device or the application corresponding to a predetermined system state that is defined within the particular diagnostic package as being a cause of the performance issue.

Example clause H, the client device of any one of Example clauses A through G, wherein the particular diagnostic package is configured to deploy a natural language understanding model to analyze the description of the performance issue at the client device.

Example clause I, a computer-implemented method, comprising: receiving inquiry data defining a plurality of inquiries that are associated with an application; monitoring user activity to determine when the user activity satisfies particular trigger criteria for a particular inquiry; responsive to the user activity satisfying the particular trigger criteria, causing exposure of the particular inquiry via an inquiry user interface; receiving a user response that is submitted, via the inquiry user interface, by a user in response to the particular inquiry, wherein the user response includes a rating of at least one feature of the application; responsive to the rating meeting a threshold rating, providing the user response to a plurality of relief evaluators to trigger analysis of the user response with respect to a plurality of diagnostic packages to identify a performance issue being reported in the user response; and responsive to the analysis satisfying a particular diagnostic package, executing a particular relief package that corresponds to the particular diagnostic package to mitigate the performance issue being reported in the user response.

Example clause J, the client device of Example clause I, further comprising determining whether a current system state of the application corresponds to a predetermined system state that is defined within the particular diagnostic package as being a cause of the performance issue being reported in the user response.

Example clause K, the client device of any one of Example clauses I through J, wherein the executing the particular relief package includes running a configuration executable that is configured to adjust the current system state to prevent further occurrences of the performance issue being reported in the user response.

Example clause L, the client device of any one of Example clauses I through K, wherein mitigating the performance issue being reported in the user response includes causing a display of a message that describes a cause of the performance issue.

Example clause M, the client device of any one of Example clauses I through L, wherein individual relief evaluators correspond to specific combinations of performance issue symptoms and performance issue causes.

Example clause N, the client device of any one of Example clauses I through M, wherein the analysis of the user response includes analyzing a natural language description, that is provided in the user response, to identify at least some aspects of the performance issue being reported in the user response.

Example clause O, the client device of any one of Example clauses I through N, wherein the plurality of relief evaluators are stored on a client device that is running the application prior to the receiving the user response that is submitted by the user in response to the particular inquiry.

Example clause P, a client device, comprising: one or more processors; a memory in communication with the one or more processors, the memory having computer-readable instructions stored thereupon which, when executed by the one or more processors, cause the client device to: receive inquiry data defining a plurality of inquiries that are associated with an application; receive a plurality of relief evaluators for analyzing individual user responses to individual inquiries to determine when the individual user responses report predetermined performance issue symptoms; receive a user response that is submitted by a user in response to a particular inquiry; provide the user response to the plurality of relief evaluators to identify a particular performance issue symptom that is being reported in the user response; determine whether a current system state of the client device or the application is defined within the plurality of relief evaluators as being a cause of the particular performance issue symptom; and in response to determining that the current system state is defined as being the cause of the particular performance issue symptom, executing a relief package to mitigate the particular performance issue symptom.

Example clause Q, the client device of Example clause P, wherein providing the user response to the plurality of relief evaluators is responsive to a rating that is provided in the user response meeting at least a threshold rating defined for the plurality of relief evaluators.

Example clause R, the client device of any one of Example clauses P through Q, wherein the plurality of relief evaluators are staged on the client device prior to receiving the user response that is submitted by the user in response to the particular inquiry.

Example clause S, the client device of any one of Example clauses P through R, wherein the user response includes a natural language description of the particular performance issue symptom.

Example clause T, the client device of any one of Example clauses P through S, wherein the plurality of relief evaluators are configured to analyze the natural language description using a natural language understanding model to identify the particular performance issue symptom.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:
1. A client device, comprising:
one or more processors;
a memory in communication with the one or more processors, the memory having computer-readable instructions stored thereupon which, when executed by the one or more processors, cause the client device to:
receive inquiry data that defines (i) an inquiry that is associated with an application, and (ii) trigger criteria for triggering exposure of the inquiry via an inquiry user interface;
store, locally at the client device, a diagnostic package that is executable to determine whether individual user responses, to the inquiry, describe a predetermined performance issue associated with the application,
store, locally at the client device, a relief package that is executable to mitigate the predetermined performance issue associated with the application; and
subsequent to storing the diagnostic package and the relief package locally at the client device:
monitor user activity to determine when the user activity satisfies the trigger criteria for the inquiry that is associated with the application;
responsive to the user activity satisfying the trigger criteria, cause exposure of the inquiry via the inquiry user interface;
receive a user response that is submitted via the inquiry user interface in response to the inquiry;
determine, based on the diagnostic package that is stored locally on the client device prior to the user response being submitted, that the user response describes the performance issue; and
based on the user response describing the performance issue, execute the relief package, that is stored locally on the client device prior to the user response being submitted, to mitigate the performance issue associated with the application.
2. The client device of claim 1, wherein the computer-readable instructions further cause the client device to:
determine a rating that is submitted in association with the user response; and provide a description of the performance issue, from the user response, to a plurality of relief evaluators in response to the rating being less than or equal to a threshold rating.

3. The client device of claim 1, wherein the user response includes a description of the performance issue that is a natural language input that is generated by the user, via a user input device, in association with the inquiry user interface.

4. The client device of claim 1, wherein executing the relief package causes the client device to display a message that describes a cause of the performance issue.

5. The client device of claim 1, wherein executing the relief package includes causing the client device to run a configuration executable that is configured to adjust one or more system parameters to prevent further occurrences of the performance issue at the client device.

6. The client device of claim 1, wherein the computer-readable instructions further cause the client device to determine whether a current system state of at least one of the client device or the application corresponds to a predetermined system state that is defined within the diagnostic package as being a cause of the performance issue.

7. The client device of claim 1, wherein the executing the relief package is in response to a current system state of at least one of the client device or the application corresponding to a predetermined system state that is defined within the diagnostic package as being a cause of the performance issue.

8. The client device of claim 1, wherein the diagnostic package is configured to deploy a natural language understanding model to analyze a description of the performance issue at the client device, wherein the description of the performance issue is included within the user response that is provided via the inquiry user interface.

9. A computer-implemented method, comprising:
receiving, at a client device, inquiry data defining a plurality of inquiries that are associated with an application;
storing, locally at the client device, a diagnostic package that is executable to determine whether individual user responses, to a particular inquiry, describes a predetermined performance issue associated with the application,
storing, locally at the client device, a relief package that is executable to mitigate the predetermined performance issue associated with the application; and
subsequent to storing the diagnostic package and the relief package locally at the client device, monitoring user activity to determine when the user activity satisfies particular trigger criteria for the particular inquiry;
responsive to the user activity satisfying the particular trigger criteria, causing exposure of the particular inquiry via an inquiry user interface;
receiving a user response that is submitted, via the inquiry user interface, in association with the particular inquiry, wherein the user response includes a rating of at least one feature of the application;
responsive to the rating meeting a threshold rating, causing an analysis of the user response with respect to the diagnostic package to identify a performance issue being reported in the user response, and wherein the analysis of the user response with respect to the diagnostic package occurs locally at the client device; and
responsive to the analysis satisfying a particular diagnostic package, executing a particular relief package that corresponds to the particular diagnostic package to mitigate the performance issue being reported in the user response.

10. The computer-implemented method of claim 9, further comprising determining whether a current system state of the application corresponds to a predetermined system state that is defined within the particular diagnostic package as being a cause of the performance issue being reported in the user response.

11. The computer-implemented method of claim 10, wherein the executing the particular relief package includes running a configuration executable that is configured to adjust the current system state to prevent further occurrences of the performance issue being reported in the user response.

12. The computer-implemented method of claim 9, wherein mitigating the performance issue being reported in the user response includes causing a display of a message that describes a cause of the performance issue.

13. The computer-implemented method of claim 9, wherein individual relief evaluators correspond to specific combinations of performance issue symptoms and performance issue causes.

14. The computer-implemented method of claim 9, wherein the analysis of the user response includes analyzing a natural language description, that is provided in the user response, to identify at least some aspects of the performance issue being reported in the user response.

15. The computer-implemented method of claim 9, wherein a plurality of relief evaluators are stored on the client device that is running the application prior to the receiving the user response that is submitted by the user in response to the particular inquiry.

16. A client device, comprising:
one or more processors;
a memory in communication with the one or more processors, the memory having computer-readable instructions stored thereupon which, when executed by the one or more processors, cause the client device to:
receive inquiry data defining a plurality of inquiries that are associated with an application;
receive a plurality of relief evaluators for analyzing individual user responses to individual inquiries to determine when the individual user responses report predetermined performance issue symptoms;
subsequent to receiving the plurality of relief evaluators, receive a user response that is submitted by a user in response to a particular inquiry;
analyze, locally at the client device, the user response based on the plurality of relief evaluators to identify a particular performance issue symptom that is being reported in the user response;
determine whether a current system state of the client device or the application is defined within the plurality of relief evaluators as being a cause of the particular performance issue symptom; and
in response to determining that the current system state is defined as being the cause of the particular performance issue symptom, execute a relief package to mitigate the particular performance issue symptom.

17. The client device of claim 16, wherein providing the user response to the plurality of relief evaluators is responsive to a rating that is provided in the user response meeting at least a threshold rating defined for the plurality of relief evaluators.

18. The client device of claim 16, wherein the user response includes a natural language description of the particular performance issue symptom.

19. The client device of claim 18, wherein the plurality of relief evaluators are configured to analyze the natural language description using a natural language understanding model to identify the particular performance issue symptom.

20. The client device of claim 16, wherein the computer-readable instructions further cause the client device to:
   provide the user response to both of:
      the plurality of relief evaluators that are locally stored on the client device, and
      a user response database that is remotely stored on one or more servers.

* * * * *